United States Patent
Sato et al.

(10) Patent No.: US 7,181,628 B2
(45) Date of Patent: Feb. 20, 2007

(54) INFORMATION TERMINAL DEVICE AND CONTENT BACKUP METHOD

(75) Inventors: Jun Sato, Kawasaki (JP); Toru Terauchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 88 days.

(21) Appl. No.: 10/946,528

(22) Filed: Sep. 20, 2004

(65) Prior Publication Data

US 2005/0267846 A1 Dec. 1, 2005

(30) Foreign Application Priority Data

May 28, 2004 (JP) ............................. 2004-160049

(51) Int. Cl.
G06F 11/30 (2006.01)
G06F 12/14 (2006.01)
H04L 9/32 (2006.01)

(52) U.S. Cl. ..................... 713/189; 705/52; 455/558

(58) Field of Classification Search ................ 705/52; 713/193, 156, 189; 709/225; 455/558
See application file for complete search history.

(56) References Cited

U.S. PATENT DOCUMENTS

2001/0051996 A1* 12/2001 Cooper et al. .............. 709/217
2002/0161715 A1* 10/2002 Koyata et al. ................ 705/58
2002/0169004 A1 11/2002 Thil et al.
2002/0184515 A1* 12/2002 Oho et al. ................... 713/193
2002/0194355 A1* 12/2002 Morita et al. ............... 709/231
2003/0061165 A1* 3/2003 Okamoto et al. ............. 705/52
2003/0074569 A1 4/2003 Yamauchi et al.
2003/0079133 A1* 4/2003 Breiter et al. ............... 713/182
2004/0243819 A1* 12/2004 Bourne et al. .............. 713/193

OTHER PUBLICATIONS

Open Mobile Alliance, DRM Specification, Candidate Version 2.0—Jul. 16, 2004, title page and pp. 3(142)-pp. 6(142) and p. 66(142)—Off Device Storage of Content and Rights Object (9.6).

* cited by examiner

Primary Examiner—Calvin L. Hewitt, II
Assistant Examiner—Nancy Le
(74) Attorney, Agent, or Firm—Frishauf, Holtz, Goodman & Chick, P.C.

(57) ABSTRACT

A management information generating section generates management information in which the correspondence between content data and rights data is described when a digital DCF container containing encrypted content data and a rights object described in association with a right which decrypt the content data are stored in an external media card. A backup section writes the DCF container, rights object and management information onto the external media card.

20 Claims, 10 Drawing Sheets

INFORMATION TERMINAL DEVICE AND CONTENT BACKUP METHOD

CROSS-REFERENCE TO RELATED APPLICATIONS

This application is based upon and claims the benefit of priority from prior Japanese Patent Application No. 2004-160049, filed May 28, 2004, the entire contents of which are incorporated herein by reference.

BACKGROUND OF THE INVENTION

1. Field of the Invention

This invention relates to an information terminal device having a function of backing up encrypted content data to an external storage medium and a content backup method which performs the above backup operation.

2. Description of the Related Art

In the Open Mobile Alliance (OMA), Digital Rights. Management Version 2 (DRM 2) has released a specification for managing the right to decrypt or use encrypted content.

According to the above specification, content and a rights object containing information indicating the right of decrypting the content and key information are distributed separately. The rights object is associated with the content by use of an ID (ContentID) attached to the content. Decrypting of the content is performed by referring to the correct rights object. The rights object is independently bound with the terminal or bound with the terminal and user identity module (UIM) which the user has, and a specification which prevents decryption on an other terminal or the like is defined in the rights object.

The backup of the content is defined as "Off device storage of contents and rights objects" section in the above specification and requirements that the right object which requires the status management for the stateful rights should not be output or the like are defined, however, the right object which does not requires the status management for the rights, e.g. stateless rights can be output or the like. However, in the above specification, technical information about the concrete storage method is not defined.

The content and rights objects can be contained in different files in a file structural form and are separated on a file system. Therefore, in order to restore content and rights objects from an external storage medium in which plural sets of content and rights objects are backed up to an information terminal device, it becomes necessary to search for an ID which is used to recognize the correspondence relationship between the content and the rights objects.

Further, it is required to make an attempt to parse and check whether or not the rights objects backed up in the external storage device or medium are bound with the information terminal device into which the rights objects are to be restored.

In a case where single content is separately acquired together with different rights objects, the capacity of the external storage device or medium is uselessly suppressed if the above content is repetitively stored in the external storage device.

Under this condition, it is desired to efficiently back up content data and rights data such as content and rights objects in OMA DRM 2.

BRIEF SUMMARY OF THE INVENTION

According to first aspect of the present invention, there is provided an information terminal device which deals with encrypted content data and rights data described in association with a right which decrypt the content data, the device comprising: generating means which generates management data in which the correspondence relationship between the content data and the rights data is described when the content data and rights data are stored in an external storage medium, and write means which writes the content data, rights data and management data into the external storage medium.

According to second aspect of the present invention, there is provided a content backup method which backs up encrypted content data and rights data described in association with a right which decrypt the content data into an external storage medium, the method comprising: generating management data in which the correspondence relationship between the content data and the rights data is described when the content data and rights data are backed up to the external storage medium, and writing the content data, rights data and management data into the external storage medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

There will now be described one embodiment of this invention with reference to the accompanying drawings.

Figure 1:
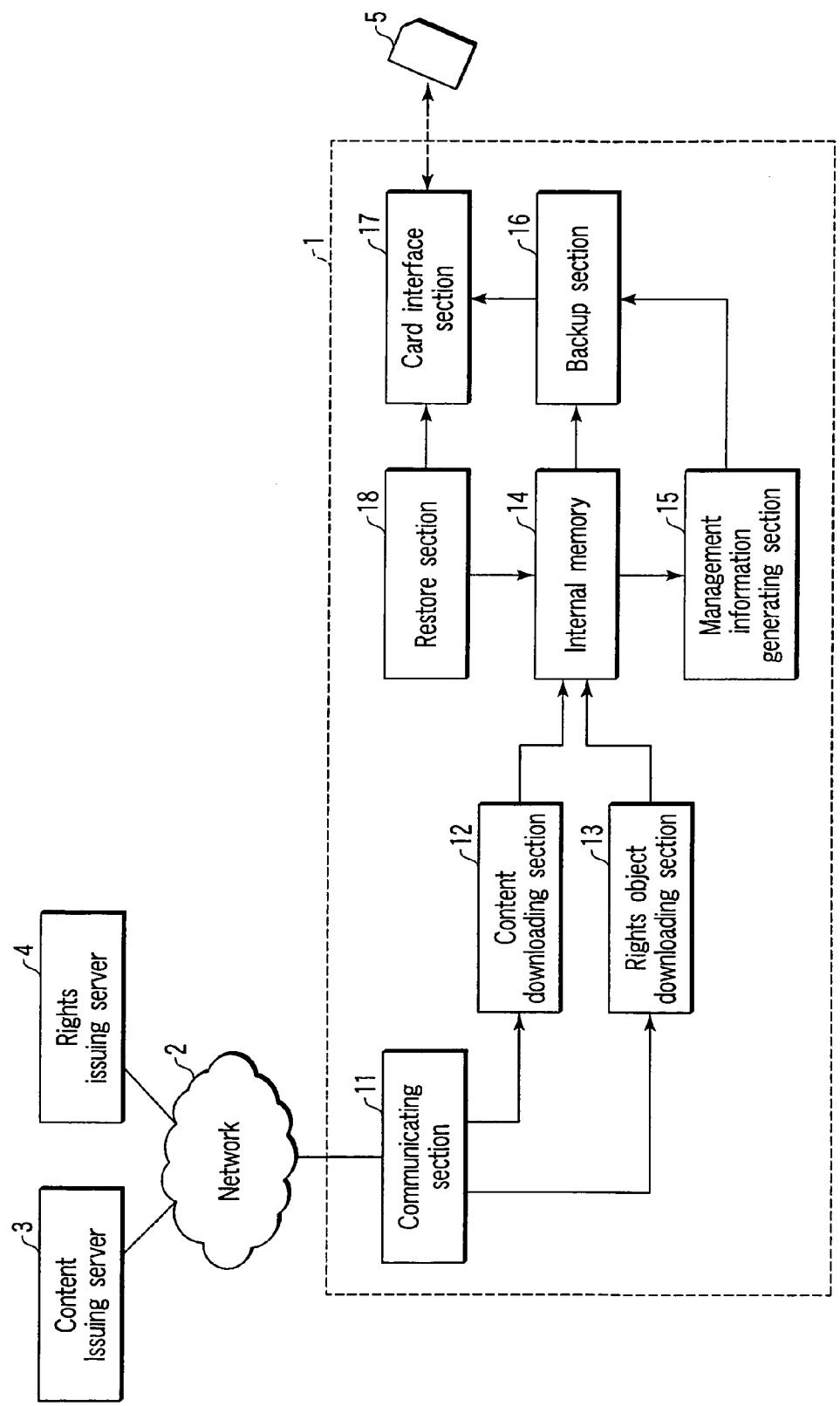
FIG. 1 is a block diagram showing the configuration of the main portion of an information terminal device according to one embodiment of this invention.

FIG. 1 is a block diagram showing the configuration of the main portion of an information terminal device 1 according to the present embodiment.

As shown in FIG. 1, the information terminal device 1 according to the present embodiment includes a communicating section 11, content downloading section 12, rights object downloading section 13, internal memory 14, management information generating section 15, backup section 16, card interface section 17 and restore section 18.

The information terminal device 1 can use an existing mobile telephone unit as basic hardware, for example. The content downloading section 12, rights object downloading section 13, management information generating section 15, backup section 16 and restore section 18 can be realized by causing a processor mounted in the mobile telephone unit to execute a program. At this time, the information terminal device 1 can be realized by previously installing the program in the mobile telephone unit or realized by recording the program in a removable storage medium such as a memory card or distributing the program via a network and adequately installing the program in the mobile telephone unit. As the internal memory 14, a storage device such as a RAM or flash memory provided in the mobile telephone unit can be utilized.

The communicating section 11 makes communication via a network 2 containing a mobile communication network and the Internet, for example.

The content downloading section 12 accesses a content issuing server 3 via the communicating section 11 and network 2 and downloads a digital content format (DCF) container. The DCF container contains content data in a format corresponding to the specification of OMA DRM 2. To the DCF container, ContentID is attached as a content ID.

The rights object downloading section 13 accesses a rights issuing server 4 via the communicating section 11 and network 2 and downloads a rights object. In the rights object, rights data, indicating the rights used to decrypt the content data received in the DCF container, and key data to decrypt the content data, are described.

The internal memory 14 stores the DCF container and rights objects.

When the DCF container and rights objects stored in the internal memory 14 are backed up to the external media card 5, the management information generating section 15 generates management information associated with the DCF container and rights objects to be backed up.

The backup section 16 performs a process to write the DCF container and rights objects stored in the internal memory 14 to the external media card 5 via the card interface section 17.

The external media card 5 can be freely mounted in the card interface section 17 and a data write operation into the external media card 5 and a data read operation from the external media card 5 can be performed via the card interface section 17.

The restore section 18 acquires the DCF container and rights objects backed up to the external media card 5 via the card interface section 17 and restore the same to the internal memory 14.

Next, the operation of the information terminal device with the above configuration is explained.

When the user requires to acquire content via a user interface (not shown), the content downloading section 12 accesses the content issuing server 3 to download the DCF content and store the DCF content in the internal memory 14. The thus downloaded DCF container is bound with the information terminal device and stored according to the specification of the OMA DRM 2.

When the user requires to acquire a rights object via the user interface (not shown), the rights object downloading section 13 accesses the rights issuing server 4 to download the rights object. At this time, the information terminal device 1 transfers identification information indicating the information terminal device 1 to the rights issuing server 4. Based on the information, the rights issuing server 4 encrypts the rights object by use of a public key of the information terminal device 1. The rights object downloading section 13 stores the rights object in the internal memory 14.

Figure 2:
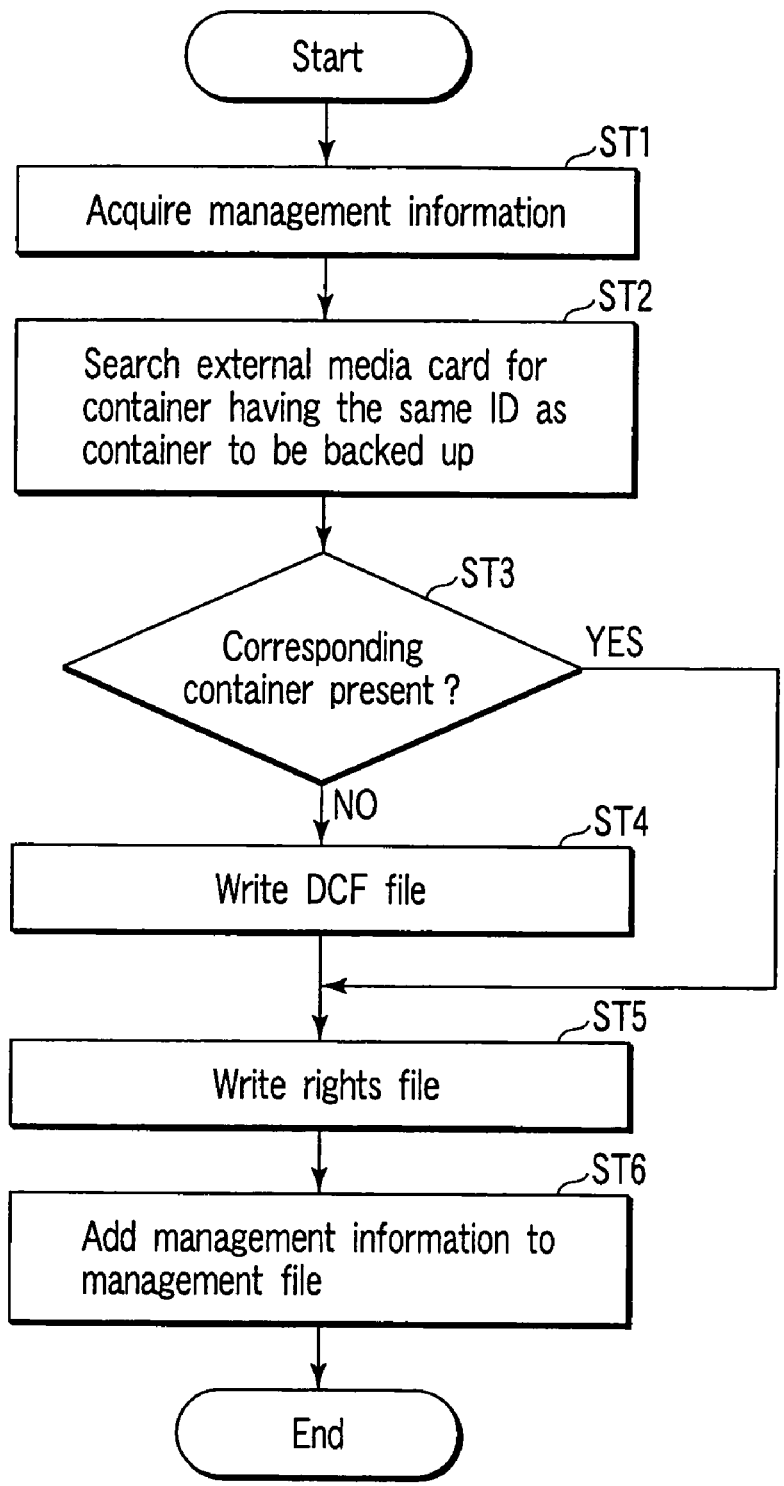
FIG. 2 is a flowchart showing the processing procedure of a backup section in FIG. 1.

When the DCF container and the rights object corresponding to the DCF container are stored in the internal memory 14 and if the user requires to back up the DCF container and rights object, the backup section 16 performs a process as shown in FIG. 2.

In step ST1, the backup section 16 requests the management information generating section 15 to generate management information and acquires the thus generated management information from the management information generating section 15. The operation for generating the management information by the management information generating section 15 is explained later.

In step ST2, the backup section 16 searches management information already backed up in the external media card 5 for a DCF container having the same ContentID as a DCF container which is to be backed up. In this case, the above process may be performed by searching DCF containers backed up in the external media card 5 for a DCF container having the same ContentID as a DCF container which is to be backed up. In step ST3, the backup section 16 checks whether or not a corresponding DCF container is detect.

If the corresponding DCF container is not detected, the process by the backup section 16 proceeds from step ST3 to ST4. In step ST4, the backup section 16 reads out the DCF container which is to be backed up in the present cycle from the internal memory 14 and writes a DCF file having attribute information or the like attached to the DCF container into the external media card 5 via the card interface section 17. After this, the process of the backup section 16 proceeds to step ST5.

If the corresponding DCF container is detected by the search process in step ST2, the process by the backup section 16 proceeds from step ST3 to ST5. That is, in this case, the backup section 16 bypasses step ST4.

In step ST5, the backup section 16 reads out a rights object which is to be backed up in the present cycle from the internal memory 14 and writes a rights file having attribute information or the like attached to the rights object into the external media card 5 via the card interface section 17. After this, the backup section 16 adds management information acquired in step ST1 to the management file of the external media card 5 via the card interface section 17 in step ST6. Then, the backup section 16 terminates the process of FIG. 2.

Figure 3:
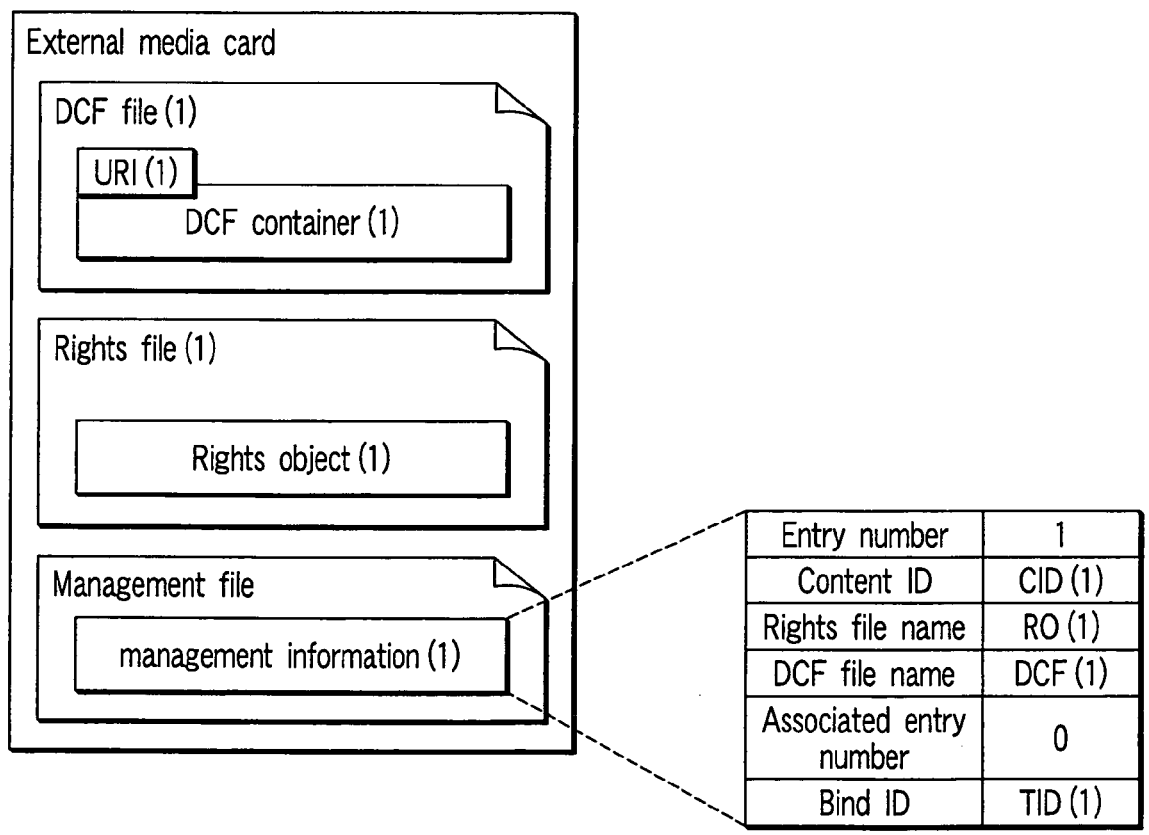
FIG. 3 is a diagram showing one example of the storage state of data in an external media card of FIG. 1.

One set of a DCF file (1) and rights file (1) and a corresponding management information item (1) as shown in FIG. 3 are stored in the external media card 5 by the above process when only one set of the DCF container and rights object is backed up in the external media card 5.

As shown in FIG. 3, management information contains various items of an entry number, content ID, rights file name, DCF file name, associated entry number and bind ID. In the item of the entry number, an identification number issued to distinguish the management information from other management information items stored in the external media card 5 is described. In the item of the contents ID, ControlID attached to the DCF controller to be managed is described. In the item of the rights file name, a name attached to the rights file to be managed is described. In the item of the DCF file name, a name attached to the DCF file having a DCF container to be managed is described. In the item of the associated entry number, an entry number of another management information item which deals with a DCF container to be managed as a to-be-managed object is described. In the item of the bind ID, a terminal ID attached to the information terminal device with which the DCF container to be managed is bound is described.

In the example of FIG. 3, the management information generating section 15 describes "1" as the entry number, "CID(1)" which is ContentID of the DCF container (1) as the content ID, "RO(1)" which is the name of the rights file (1) as the rights file name, "DCF(1) which is the name of the DCF file (1) containing the DCF container (1) as the DCF file name, "0" indicating that associated management information is not present as the associated entry number and "TID(1) which is a terminal ID attached to the information terminal device 1 as the bind ID to generate management information as shown in the drawing.

Since the external media card 5 can be removably mounted in the card interface section 17, it can be removed from the information terminal device 1, mounted in another information terminal device and used.

Figure 4:
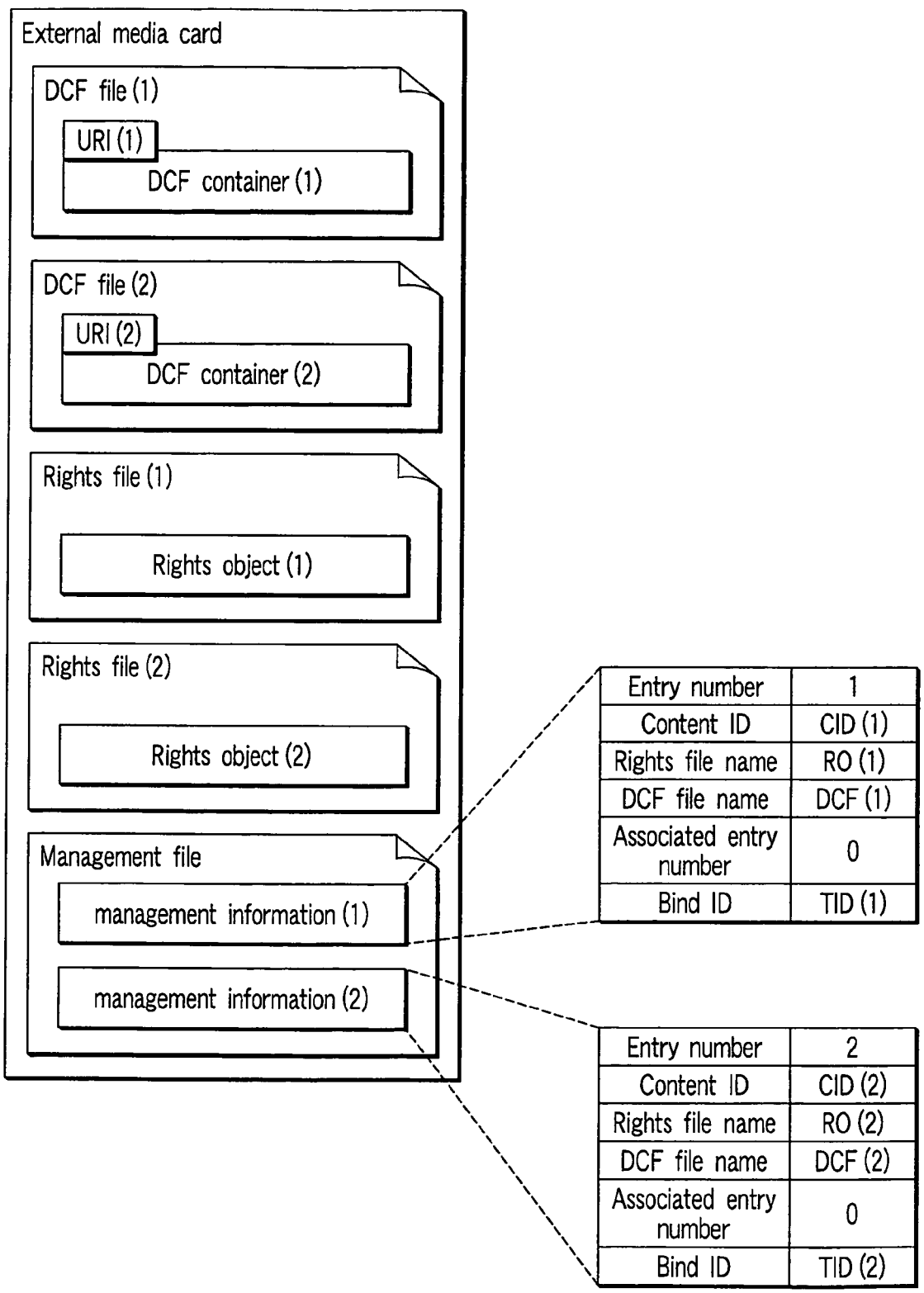
FIG. 4 is a diagram showing one example of the storage state of data in the external media card of FIG. 1.

Now, consider a case wherein a DCF container (2) and rights object (2) are newly backed up to the external media card 5 set in the state shown in FIG. 3 by use of an information terminal device having "TID(2)" attached thereto as the terminal ID. In this case, a DCF file (2) containing a DCF container (2) as shown in FIG. 4 is additionally stored in the external media card 5 and a rights file (2) containing a rights object (2) is stored in the external media card 5. Further, management information (2) which is formed in the same manner as the management information (1) in relation to the DCF container (2) and rights file (2) is added to the management file. As shown in FIG. 4, in the management information (2), "TID(2)" is described as the terminal ID.

Next, consider a case wherein the external media card 5 set in the state of FIG. 4 is set back into the information terminal device 1 to newly back up the DCF container (1) and rights object (3). In this case, since the DCF container (1) is already stored in the external media card 5, only a rights file (3) containing the rights object (3) is stored in the external media card 5. Further, management information (3) which is formed in the same manner as the management information (1) in relation to the DCF container (1) and rights object (3) is additionally provided in the management file. The management information (1) and management information (3) are each associated with the same DCF container (1). Therefore, as the associated entry number in the management information (3), "1," which is the entry number of the management information (1) is described. Further, the associated entry number of the management information (1) is updated to "3," which is the entry number of the management information (3)

Figure 5:
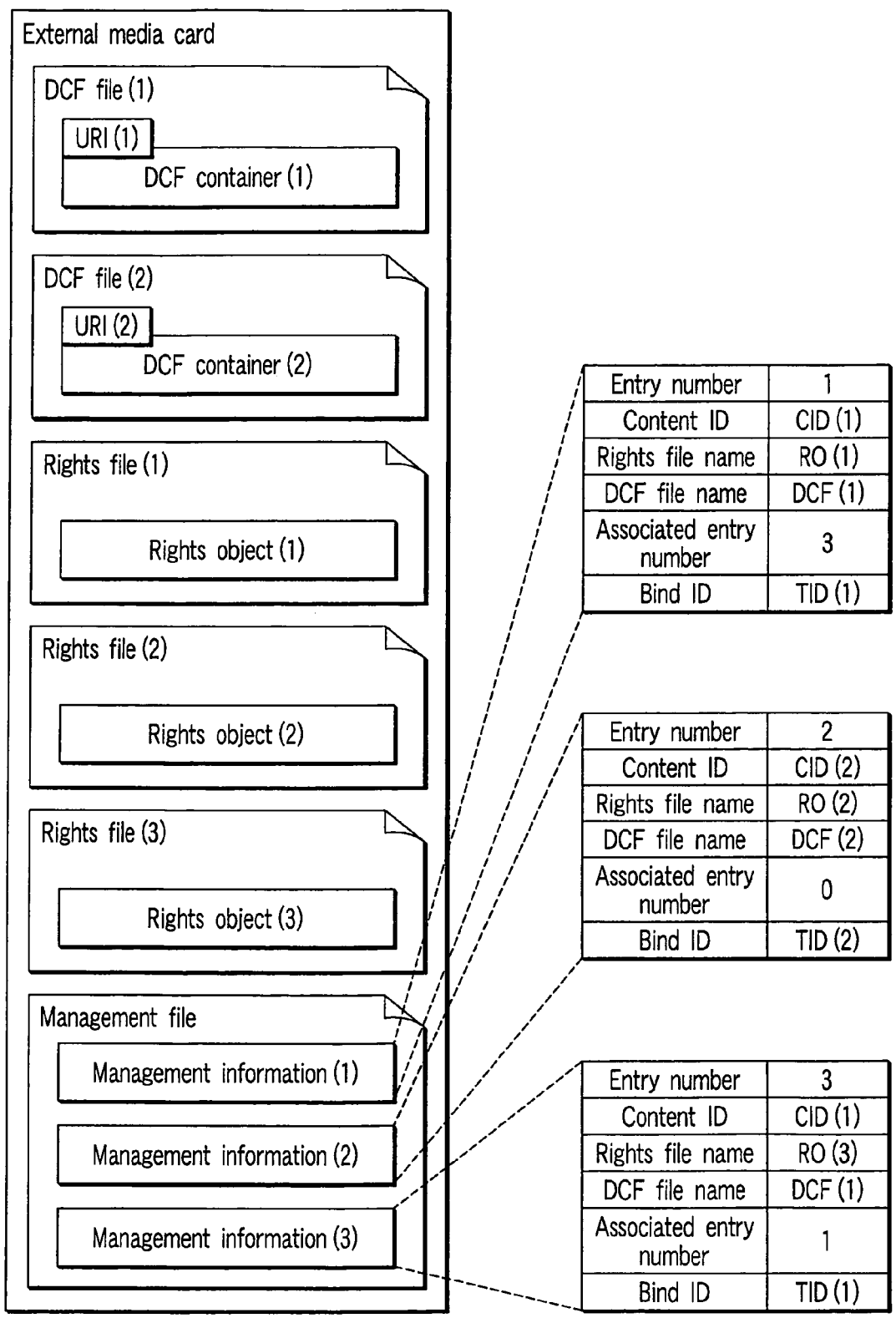
FIG. 5 is a diagram showing one example of the storage state of data in the external media card of FIG. 1.
Figure 6:
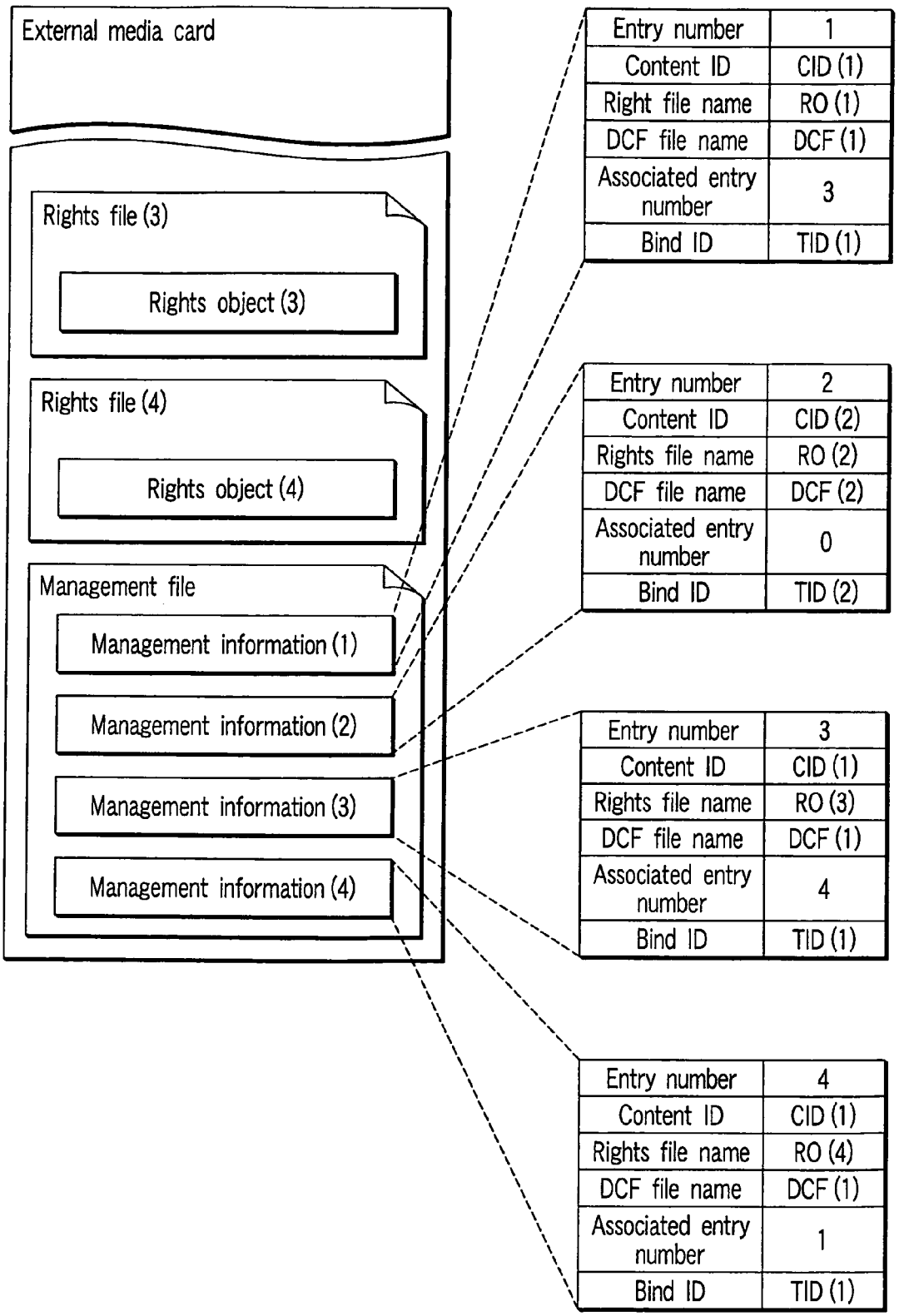
FIG. 6 is a diagram showing one example of the storage state of data in the external media card of FIG. 1.

In a case where three or more management information items associated with the same DCF container are provided, the associated entry number of the management information which is last generated among the management information items is dealt with as the entry number of the management information which is generated at the earliest time. As the associated entry numbers of the other management information items, the entry numbers of the management information items which are generated next to the respective management information items may be used. More specifically, if the management information (4) associated with the DCF container (1) is additionally provided in the state shown in FIG. 5, the associated entry number of the management information (1) is set to "3", the associated entry number of the management information (3) is set to "4" and the associated entry number of the management information (4) is set to "1" as shown in FIG. 6.

Figure 7:
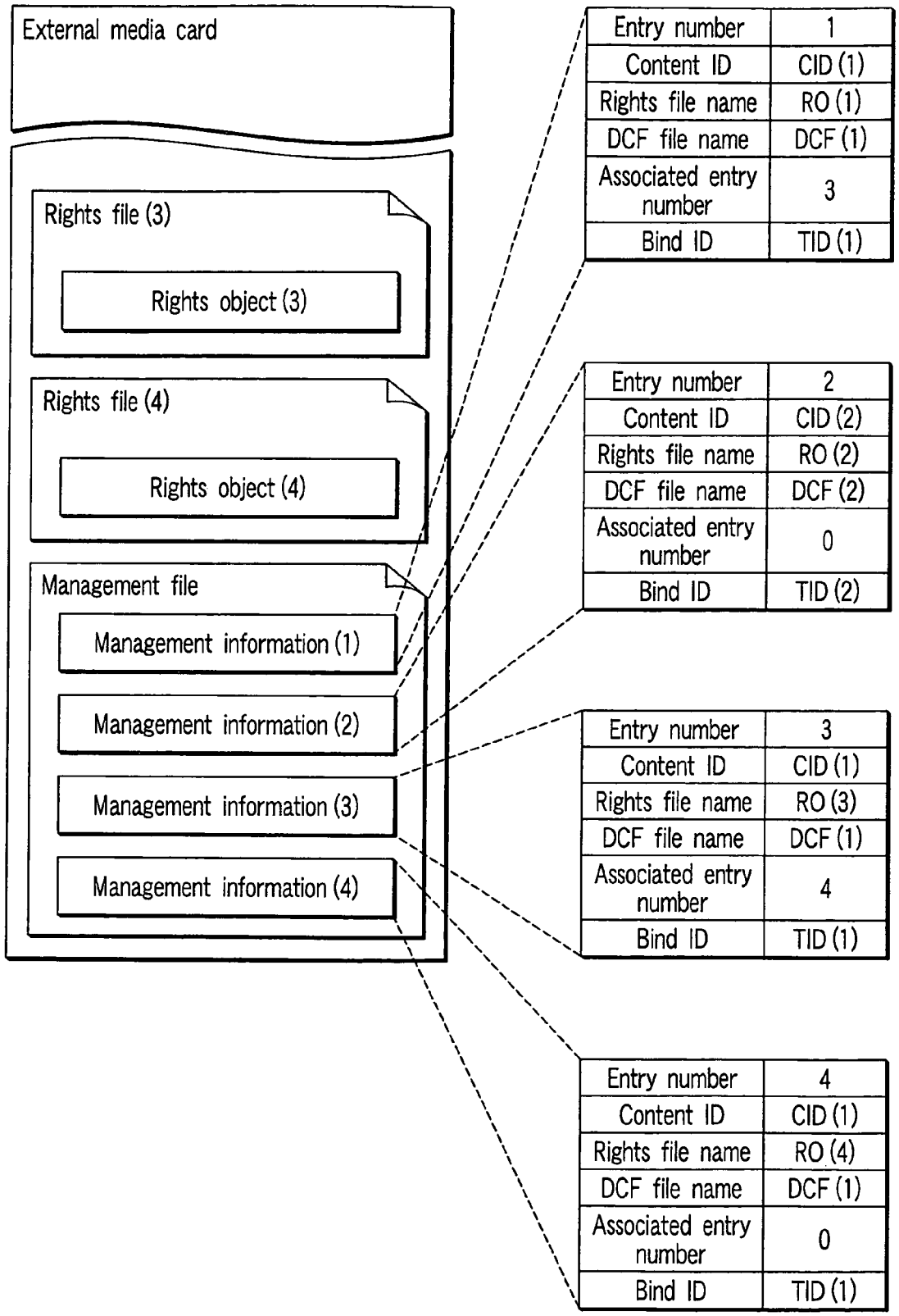
FIG. 7 is a diagram showing a modification of an associated entry number in the external media card of FIG. 1.

Further, in the associated entry number specifying method, the associated entry number of the management information which is last added is set to "0" and the management information can be indicated as the last management information. More specifically, if the management information (4) associated with the DCF container (1) is additionally provided in the state shown in FIG. 5, the associated entry number of the management information (1) is set to "3", the associated entry number of the management information (3) is set to "4" and the associated entry number of the management information (4) is set to "0" as shown in FIG. 7.

Figure 8:
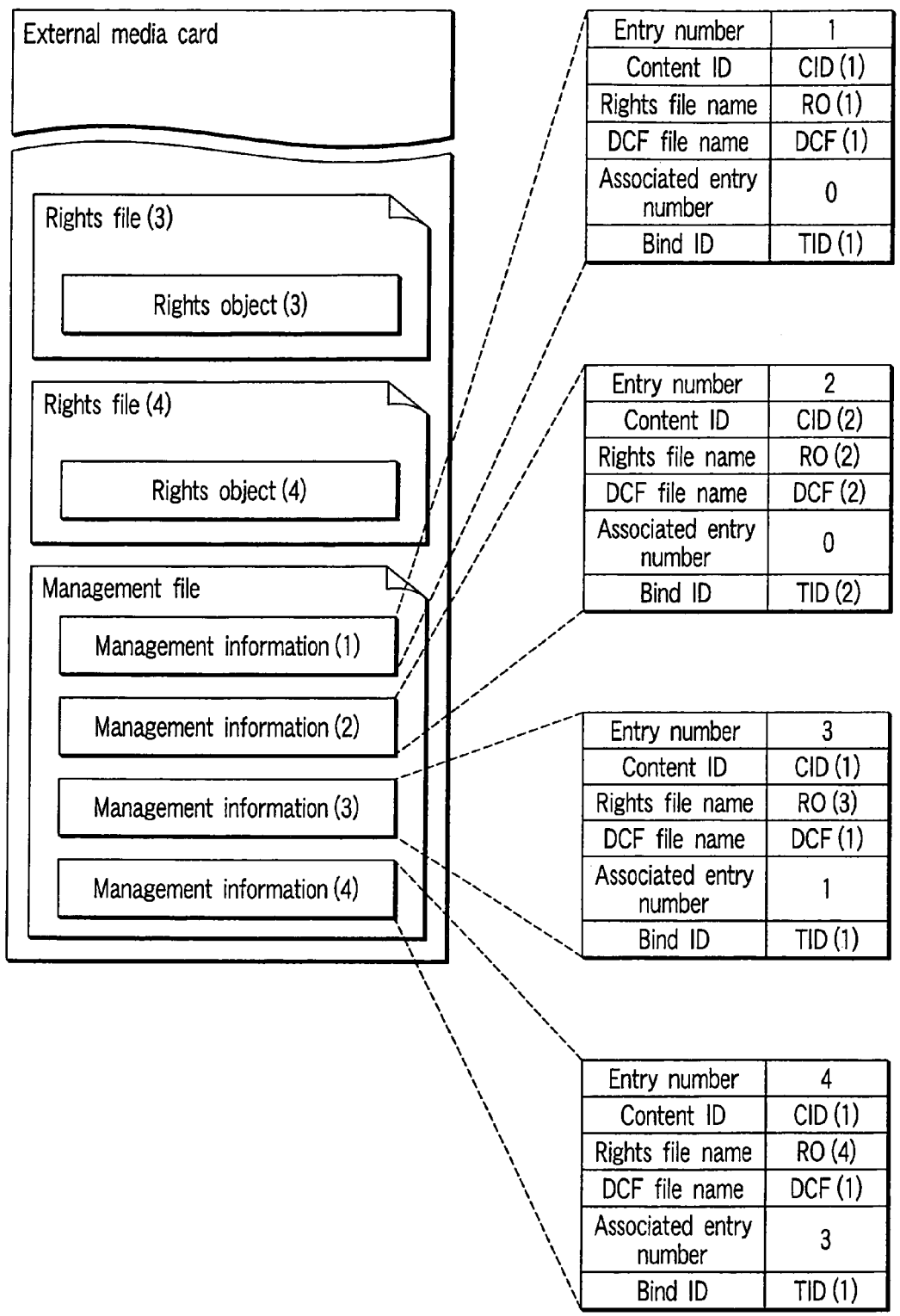
FIG. 8 is a diagram showing a modification of the associated entry number in the external media card of FIG. 1.

On the other hand, the associated entry number of the management information which is later generated can be dealt with as the entry number of the newest management information which is already generated. For example, if three management information items (1), (3), (4) associated with the DCF container (1) are provided and generated in this order, the associated entry number of the management information (1) is set to "0", the associated entry number of the management information (3) is set to "1" and the associated entry number of the management information (4) is set to "3" as shown in FIG. 8.

Figure 9:
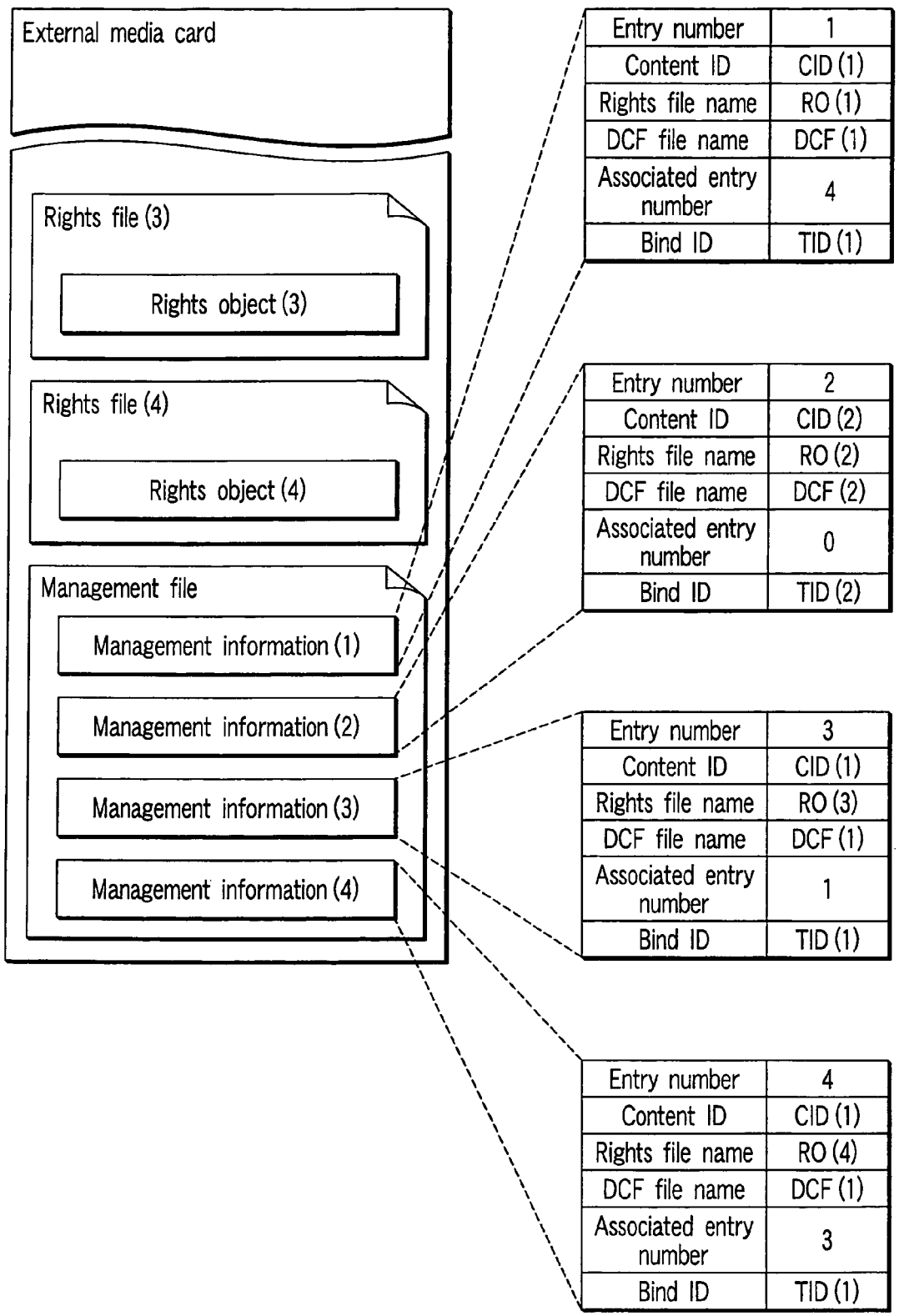
FIG. 9 is a diagram showing a modification of the associated entry number in the external media card of FIG. 1.

Further, when the associated entry number of the management information which is later generated is set as the entry number of the newest management information which is already generated, the associated entry number of the first management information can be set as the last added entry number. For example, if three management information items (1), (3), (4) associated with the DCF container (1) are provided and generated in this order, the associated entry number of the management information (1) is set to "4", the associated entry number of the management information (3) is set to "1" and the associated entry number of the management information (4) is set to "3" as shown in FIG. 9.

Figure 10:
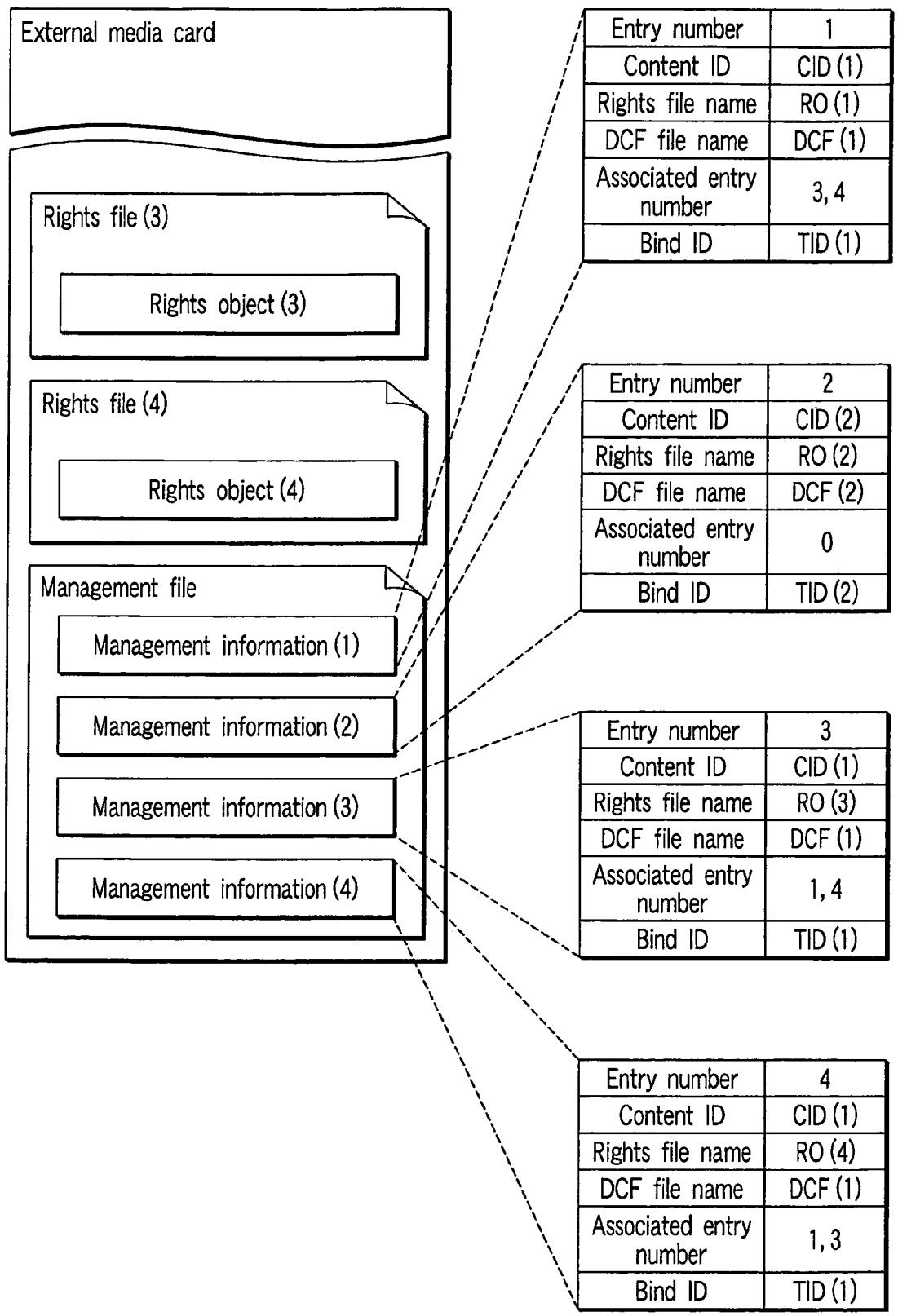
FIG. 10 is a diagram showing a modification of the associated entry number in the external media card of FIG. 1.

Further, it is possible to indicate a plurality of entry numbers for the associated entry number of one management information item. For example, if three management information items (1), (3), (4) associated with the DCF container (1) are provided, the associated entry number of the management information (1) is set to "3, 4", the associated entry number of the management information (3) is set to "1, 4" and the associated entry number of the management information (4) is set to "1, 3" as shown in FIG. 10.

Thus, in the restore section 18, the correspondence relationship between the rights object and the DCF container backed up in the external media card 5 can be confirmed by referring to the management information stored in the external media card 5. Therefore, it is not necessary to perform the search operation for ContentID contained in the rights object and DCF container when the restore section 18 restore data items.

Further, in the restore section 18, it is possible to determine an information terminal device with which the DCF container and rights object are bound by determining the bind ID of the management information. Therefore, the restore section 18 can be prevented from erroneously restoring rights objects which are created for another information terminal device.

Further, in the restore section 18, it is possible to determine that different rights objects are associated with the single DCF container by referring to the management information. Therefore, the restore section 18 can restore the single DCF container as a DCF container which is associated with the different rights objects. As a result, since the single DCF container can be prevented from being repetitively stored in the external media card 5, the number of steps of the process for writing the DCF container to the external media card 5 can be reduced and the capacity of the external media card 5 can be effectively used.

A case wherein the DCF container and rights object defined by OMA DRM version 2 are applied as the content data and rights data is shown as an example. However, the same process can be performed when content data and rights data which are not so defined are processed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An information terminal which manages encrypted content data and rights data used for decrypting the encrypted content data, and which is operable to store the encrypted content data and the rights data on an external storage medium, said information terminal comprising:

detecting means for detecting, that an item of encrypted content data and an item of rights data corresponding thereto are to be stored on the external storage medium, and for then detecting one of: (i) that a same encrypted content as the item of encrypted content data to be stored is already stored on the external storage medium, and (ii) that the same encrypted content as the item of encrypted content data to be stored is not already stored on the external storage medium;

generating means for (i) generating, at the information terminal, first management data that includes first identification information identifying the item of encrypted content data and second identification information identifying the corresponding item of rights data, responsive to the detecting means not detecting the same encrypted content on the external storage medium, and (ii) generating, at the information terminal, second management data that includes third identification information identifying the item of encrypted content data already stored on the external storage medium and the second identification information identifying the item of rights data, responsive to the detecting means detecting the same encrypted content on the external storage medium; and writing means for (i) writing from the information terminal to the external storage medium the generated first management data, the encrypted content data, and the rights data onto the external storage medium, responsive to the detecting means not detecting the same encrypted content on the external storage medium, and (ii) writing from the information terminal to the external storage medium the generated second management data and rights data, but not the encrypted content data, onto the external storage medium, responsive to the detecting means detecting the same encrypted content on the external storage medium.

2. The information terminal according to claim 1, wherein both the first management data and the second management data include fourth identification information identifying the information terminal.

3. The information terminal according to claim 1, further comprising means for detecting that another item of management data including the third identification information is present on the external storage medium, and for then controlling the generating means to generate the second management data to include relational information that identifies said another item of management data.

4. The information terminal according to claim 1, further comprising means for detecting that another item of management data identifying the same content data is subsequently written onto the external storage medium, and for then revising the previously stored first or second management data to include relational information that identifies the subsequently stored item of management data.

5. The information terminal according to claim 1, further comprising means for controlling the generating means to generate a plurality of items of management data that all include information identifying a same item of encrypted content data, such that each of said plurality of items of management data, except a last-generated one of said plurality of items, includes relational information that identifies a subsequently-generated one of said plurality of items of management data.

6. The information terminal according to claim 5, wherein the last-generated one of the items includes relational information that identifies a first-generated one of the items.

7. The information terminal according to claim 1, further comprising means for controlling the generating means to generate a plurality of items of management data that all include information identifying a same item of encrypted content data, such that each of said plurality of items of management data, except a first-generated one of said plurality of items, includes relational information that identifies a previously-generated one of said plurality of items of management data.

8. The information terminal according to claim 7, wherein the last-generated one of the items includes relational information that identifies a first-generated one of the items.

9. The information terminal according to claim 1, further comprising means for controlling the generating means to generate a plurality of items of management data that all include information identifying a same item of encrypted content data, such that each of said plurality of items of management data includes relational information that identifies each of the other ones of said plurality of items of management data.

10. The information terminal according to claim 1, further comprising restoring means for restoring the item of encrypted content data and the corresponding item of rights data to an internal memory of the information terminal device.

11. An information terminal which manages encrypted content data and rights data used for decrypting the encrypted content data, and which is operable to store the encrypted content data and the rights data on an external storage medium, said information terminal comprising:

a detecting section which detects that an item of encrypted content data and an item of rights data corresponding thereto are to be stored on the external storage medium, and which then detects one of: (i) that a same encrypted content as the item of encrypted content data to be stored is already stored on the external storage medium, and (ii) that the same encrypted content as the item of encrypted content data to be stored is not already stored on the external storage medium;

a generating section which (i) generates, at the information terminal, first management data that includes first identification information identifying the item of encrypted content data and second identification information identifying the corresponding item of rights data, responsive to the detecting section not detecting the same encrypted content on the external storage medium, and (ii) generates, at the information terminal, second management data that includes third identification information identifying the item of encrypted content data already stored on the external storage medium and the second identification information identifying the item of rights data, responsive to the detecting section detecting the same encrypted content on the external storage medium; and a writing section which (i) writes from the information terminal to the external storage medium the generated first management data, the encrypted content data, and the rights data onto the external storage medium, responsive to the detecting section not detecting the same encrypted content on the external storage medium, and (ii) writes from the information terminal to the external storage medium the generated second management data and rights data, but not the encrypted content data, onto the external storage medium, responsive to the detecting section detecting the same encrypted content on the external storage medium.

12. The information terminal according to claim 11, wherein both the first management data and the second management data include fourth identification information identifying the information terminal.

13. The information terminal according to claim 11, further comprising a control section which detects that another item of management data including the third identification information is present on the external storage medium, and which then controls the generating section to generate the second management data to include relational information that identifies said another item of management data.

14. The information terminal according to claim 11, further comprising a control section which detects that another item of management data identifying the same content data is subsequently written onto the external storage medium, and which then revises the previously stored first or second management data to include relational information that identifies the subsequently stored item of management data.

15. The information terminal according to claim 11, further comprising a control section which controls the generating section to generate a plurality of items of management data that all include information identifying a same item of encrypted content data, such that each of said plurality of items of management data, except a last-generated one of said plurality of items, includes relational information that identifies a subsequently-generated one of said plurality of items of management data.

16. The information terminal according to claim 15, wherein the last-generated one of the items includes relational information that identifies a first-generated one of the items.

17. The information terminal according to claim 11, further comprising a control section which controls the generating section to generate a plurality of items of management data that all include information identifying a same item of encrypted content data, such that each of said plurality of items of management data, except a first-generated one of said plurality of items, includes relational information that identifies a previously-generated one of said plurality of items of management data.

18. The information terminal according to claim 17, wherein the last-generated one of the items includes relational information that identifies a first-generated one of the items.

19. The information terminal according to claim 11, further comprising a control section which controls the generating section to generate a plurality of items of management data that all include information identifying a same item of encrypted content data, such that each of said plurality of items of management data includes relational information that identifies each of the other ones of said plurality of items of management data.

20. The information terminal according to claim 11, further comprising a restoring section to restore the item of encrypted content data and the corresponding item of rights data to an internal memory of the information terminal device.

* * * * *